Figure 7:
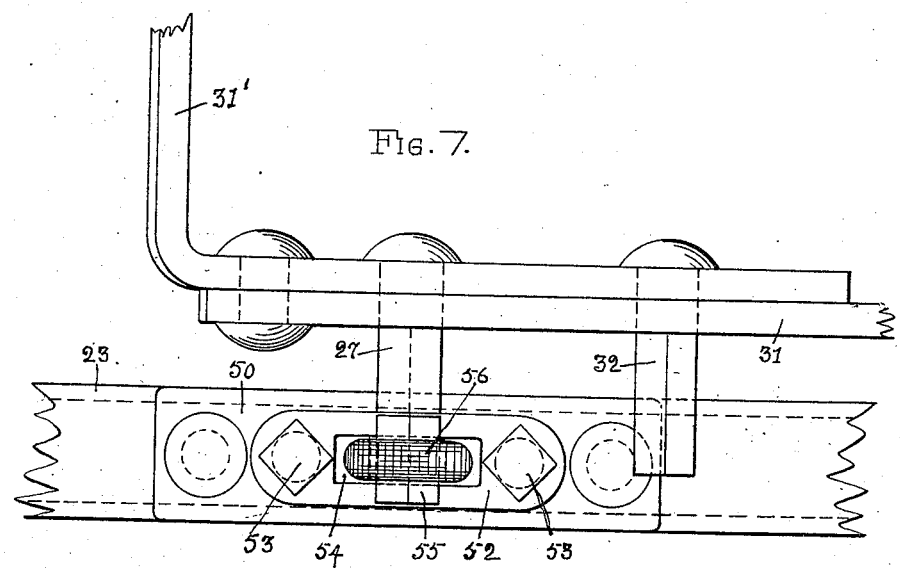

No. 833,604. PATENTED OCT. 16, 1906.
A. C. JOHNSON.
COMBINED TRUCK AND WEIGHING SCALE.
APPLICATION FILED MAR. 31, 1906.
3 SHEETS—SHEET 1.
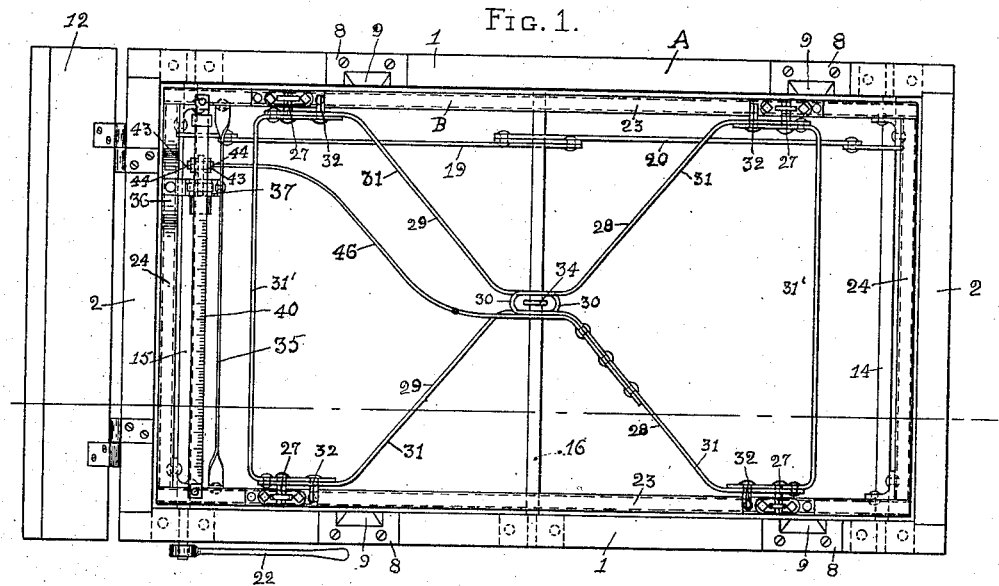
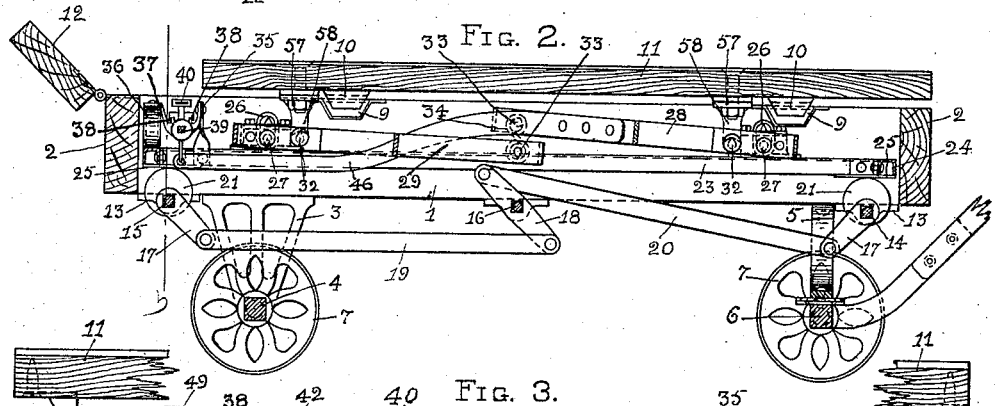
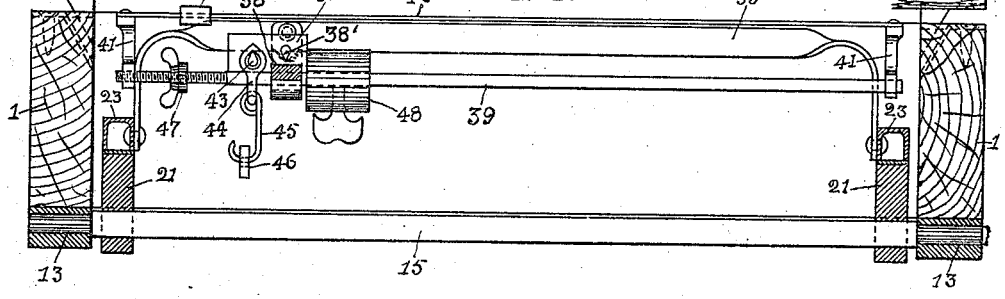
WITNESSES.
Chas A Boake
Grace Cowdrick
INVENTOR.
Alfred C. Johnson
by Robt B Witson
Attorney No. 833,604. PATENTED OCT. 16, 1906.
A. C. JOHNSON.
COMBINED TRUCK AND WEIGHING SCALE.
APPLICATION FILED MAR. 31, 1906.
3 SHEETS—SHEET 2.
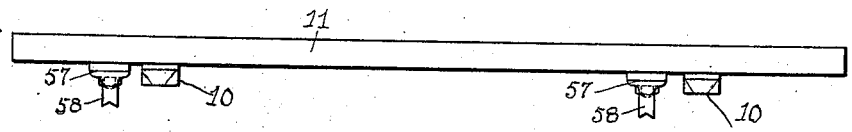
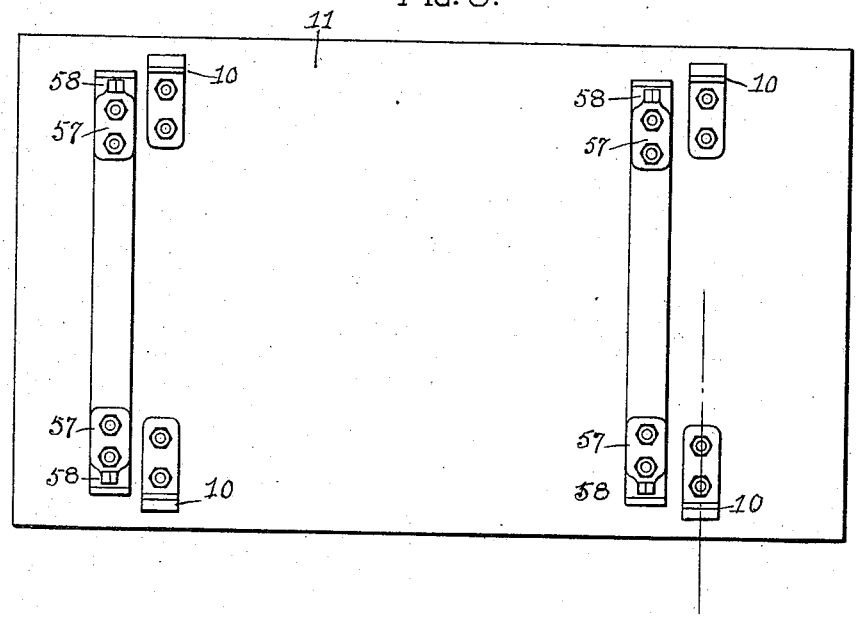
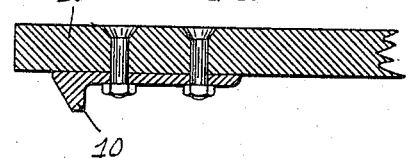
WITNESSES-
Chas A Boake
Grace Cowdrick
INVENTOR-
Alfred C. Johnson
by Robt. B. Wilson
Attorney No. 833,604. PATENTED OCT. 16, 1906.
A. C. JOHNSON.
COMBINED TRUCK AND WEIGHING SCALE.
APPLICATION FILED MAR. 31, 1906.

3 SHEETS—SHEET 3.

WITNESSES.
Chas A Boake
Grace Cowarich

INVENTOR.
Alfred C Johnson
by Robt B Wilson
Attorney

UNITED STATES PATENT OFFICE.

ALFRED C. JOHNSON, OF TOLEDO, OHIO, ASSIGNOR OF ONE-HALF TO L. A. JOHNSON, OF TOLEDO, OHIO.

COMBINED TRUCK AND WEIGHING-SCALE.

No. 833,604. Specification of Letters Patent. Patented Oct. 16, 1906.

Application filed March 31, 1906. Serial No. 309,203.

*To all whom it may concern:*

Be it known that I, ALFRED C. JOHNSON, a citizen of the United States, residing at Toledo, in the county of Lucas and State of Ohio, have invented a certain new and useful Improvement in a Combined Truck and Weighing-Scale, of which the following is a specification.

My invention relates to a combined truck and weighing-scale, and has for its object to provide a hand-truck with an accurate weighing-scale that is readily adjusted in position to weigh the load on the truck and as readily moved out of the weighing position, where it is free and independent of the load and unaffected by the operation of the truck for its ordinary and usual purposes.

A further object is to provide a truck of the kind with a weighing-scale having an independent frame to which the scale mechanism is attached, that is free from attachment to the frame of the truck, and that is readily lifted therefrom and replaced therein, and that is also free from all injurious strain or expansion to which the frame of the truck may be subjected in the use of the truck for truck purposes.

I accomplish these objects by the novel construction and combination of parts hereinafter described, and illustrated in the drawings, in which—

Figure 8:
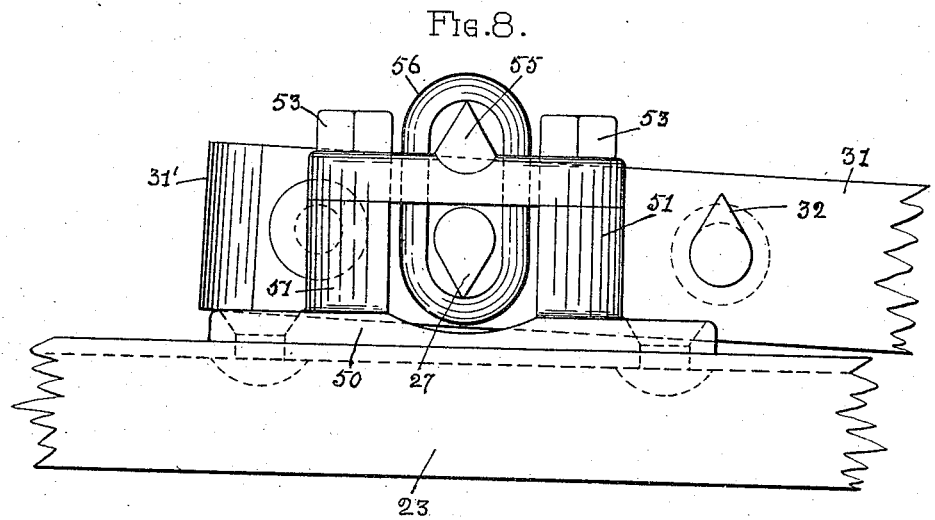

Figure 1 is a top plan view of the truck-frame and the scale-frame with the platform removed. Fig. 2 is a longitudinal section of the same on line x x of Fig. 1. Fig. 3 is a cross-section of the same on line y y of Fig. 2. Fig. 4 is a side elevation of the platform. Fig. 5 is a bottom view of the same. Fig. 6 is a cross-section on line y y. Fig. 7 is a top view of a link-bearing of the scale-levers, and Fig. 8 is a side elevation of the same.

In the drawings, A is the rectangular truck-frame comprising the side bars 1 and the end bars 2, suitably framed together at the corners formed thereby. The frame A is preferably mounted by the rear bolster-brackets 3, fixed to the rear axle 4, and the front bolster-bracket 5, pivotally mounted on the front axle 6 on the wheels 7, journaled on the axles; but it may be otherwise mounted on a suitable wheel-base.

The side bars at their front and rear end portions are provided with the guide-plates 8, which are let into suitable recesses in the tops and inner sides of the bars flush with the tops and inner sides of the bars, which guide-plates are provided with the inwardly and downwardly beveled recesses 9, having converging sides, and are adapted to receive complementary guide-lugs 10, which are secured to the under side of a rectangular platform 11 of suitable area adapted to be thereby detachably secured on the top of the frame. The platform 11 is adapted to cover all but the rear portion of the frame, to cover which there is hinged to the rear end bar the leaf 12 to open rearward, which is of a width and length to cover the remaining gear portion of the frame not covered by the platform. To the under side of the side bars there are secured in opposite pairs central and near each end of the side bars the bearings 13, in which are journaled the crank-shafts 14, 15, and 16, respectively. The end crank-shafts 14 and 15 are each provided with a crank 17, and the central shaft 16 is provided with the double crank 18.

The crank of the rear shaft 15 is connected to one end of the double crank 18 by a connecting-rod 19, and the crank of the front shaft is connected to the opposite end of the double crank by the connecting-rod 20. Upon the shafts 14 and 15 adjacent to their bearings are fixedly mounted the eccentric cams 21, all in the same relation to the shafts, and the rear shaft 15 is provided with an end extension, upon which is mounted the lever 22, which is so arranged with reference to the cams that the points on the cams nearest the centers of the shafts are uppermost when the lever 22 is extended forward in parallel line with the adjacent side bar of the frame A, and when extended opposite rearward in the same line the points of greatest eccentricity of the cams are uppermost. The cranks being connected, as described, by the connecting-rods, when the lever is operated through a half-circle in either direction the cams of one shaft will be turned opposite to the cams of the other shaft.

Within the frame A and supported on the cams 21 is mounted the rectangular scale-frame B, which is of dimensions to freely but not loosely enter between the sides and the ends of the frame A. The sides 23 and the ends 24 of the frame B are preferably constructed of channel-bars suitably secured together to form the corners of the frame and with the channels downward. The side channel-bars 23 above the cams are provided with the bearing-plates 25, which support the frame B on the cams.

The side bars 23 of the frame B, at equal distances from and near the end bars, are provided with the link-bearings 26, in which are mounted, by the knife-bearings 27, the ends of the bifurcated levers 28 and 29, which are preferably formed of bars bent to form the lapping loops 30 central of the frame B and the arms 31, diverging at equal angles to parallel alinement with the sides of the frame and having their outer end portions cross-connected by the angled end portions of the cross-bar 31'. At equal distances inward from and near the knife-bearings 27 the arms 31 are provided with the knife-bearings 32, the edges of which extend upward, and across the loops 30, in vertical alinement central of the frame B, are provided the oppositely-disposed knife-bearings 33, which are connected by the S-shaped bearing-hook 34.

Across the rear portion of the frame B, in vertical alinement with the rear end of the platform 11, is provided the bearing-support bar 35, the end portions of which are quarter-twisted and bent downward and secured at their ends to the inner sides of the frame B, as shown in Fig. 3. Opposite the bar 35 there is mounted on the rear end bar 24 a bearing-support 36, which is located near one side of the frame B, and cross-connecting the supports 35 and 36 is mounted a V-shaped yoke 37, having on its inner face, on opposite sides, the V-grooved knife-bearings 38, on which is mounted, by the knife-bearings 38', a scale-beam comprising the weight-beam 39 and the scale-bar 40, mounted thereon by the end supports 41. The bearings 38 extend from opposite sides of a bearing-block 42, which is secured to the weight-beam 39, and adjacent to the bearings 38 the block 42 is provided with the knife-bearings 43, upon which is mounted the clevis-bearing 44, having linked thereto the bearing-hook 45, upon which is pendently suspended one end of a lever 46, which extends by an upward and lateral curve from a level below the cross-bar 31' of the lever 29 over one arm 31 of the lever 29 and is secured by the opposite end portion to one of the arms 31 of the lever 28, as shown in Figs. 1 and 2. The weight-beam 39 is provided with the adjustable balancing-weights 47 and 48 on opposite sides of the bearings 38, and the scale-bar 40 is provided with the sliding weight 49, by which the weight of the load is indicated by adjustment on the scale-bar at a point where the scale-beam is balanced.

The link-bearings 26 comprise the base-plate 50, having the U-shaped lugs 51, to the tops of which is secured the bearing-plate 52 by the bolts 53. The bearing-plate 52 is provided with a longitudinal slot 54, across which is mounted the knife-bearing 55 with its edge extending upward, and upon the knife-bearing is mounted a link 56, which extends downward through the slot between the lugs. The knife-bearings 27 of the levers 28 and 29 have their bearing edges downward and extended outward into the links 56. The bearings of the levers 28 and 29 thus fulcrumed on the frame D are made automatically adjustable to the center of gravity of the load, whereby the sensitiveness and accuracy of the scale is greatly increased. To adapt the scale thus constructed to support the platform and a load placed thereon, the platform is provided on its under side with the brackets 57, having the V-grooved stud-bearings 58, which are located vertically above the knife-bearings 32 of the arms 31 of the levers 28 and 29 when the guide-lugs 10 of the platform are in the beveled recesses 9 of the side bars of the truck-frame. Thus located, when the frame B is raised part way by the cams the knife-bearings 32 engage the stud-bearings 58 of the platform and raise it above and free from the truck-frame A, and the scale-beam weights being adjusted to balance the scale-beam with the platform thereon as a load the platform may then be loaded, and the weight of the load will be indicated when the scale-beam is again brought to a balance by shifting the sliding balance-weight 49 on the scale-bar. When the load is weighed, the lever is reversed, thereby lowering the scale-frame B to its normal position free from the platform, and the platform, with its load, onto the truck-frame A, when the guide-lugs 10, seated in the beveled recesses 9, firmly secure the platform against shifting on the truck-frame while the truck with its load is being hauled to a desired destination.

By the construction shown and described I entirely avoid the attachment of the bearings of the scale-levers to the truck-frame and the detachment of the main levers from the scale-beam in order to lower the platform onto the truck-frame, and the entire scale-frame, with all its mechanism, is made readily removable from the truck-frame when it is desired to use the truck for trial purposes alone.

What I claim to be new is—

1. In a combined truck and weighing-scale, the combination of a truck-frame, a platform normally supported on the truck-frame, a weighing scale-frame, provided with a weighing-beam and with platform-supporting levers, adapted to actuate the beam said scale-frame being movably and removably mounted and supported in and by the truck-frame below the platform and normally disengaged therefrom, complementary bearings on the scale-levers and the platform, means to raise the scale to engage the bearings of the scale-levers with the bearings of the platform, and lift the platform free of the truck-frame, and to lower the scale and the platform to their normal positions, substantially as set forth.

2. In a combined truck and weighing-scale, the combination with a truck-frame of a weighing scale-frame detachably supported in the truck-frame below the top of the truck-frame, the weighing-frame being provided with a weighing scale-beam that is mounted on and supported by the weighing-frame and with bifurcated levers fulcrumed on bearings at the end portions of the weighing-frame and extending oppositely toward the center of said frame, one of said levers having an extension to the weighing scale-beam, and link supported thereon, and the other of said levers being link-supported centrally of the frame by the beam-supported lever, bearings on the bifurcated levers near and between the fulcrum of the levers, a platform mounted on the truck-frame and normally supported thereby, and having bearing-lugs adapted to engage the bearings of the scale-levers, and means to raise the scale-frame and bring the bearings of the scale-levers into engagement with the bearing-lugs of the platform and to lift the platform from the truck-frame and support it on the scale-levers, substantially as set forth.

3. In a combined truck and weighing-scale, the combination with a truck-frame, and a platform movably mounted on the truck-frame, of rock-shafts journaled in the truck-frame, cams on the rock-shafts, a scale-frame movably and removably mounted on the cams within the truck-frame, a scale-beam and gravity link-bearings mounted on the scale-frame, platform-supporting levers fulcrumed on the beam and the link-bearings within the scale-frame and provided with platform-bearings, complementary bearings on the platform normally detached from the platform-bearings of the scale-levers, and adapted to be engaged by the platform-bearings, when the scale-frame is raised by the cams, and means to operate the cams.

4. In a combined truck and weighing-scale, the combination of a truck-frame, shafts journaled transverse the bottom of the truck-frame, one near each end and one centrally between the end shafts, eccentric cams on the end shafts, one adjacent to each side of the truck-frame and between the sides, rock-arms mounted on the shafts, connecting-rods connecting the rock-arms, adapted to communicate the motion of one end shaft to produce reverse movement of the other end shaft, a weighing-scale comprising a frame having a weighing-beam directly supported and fulcrumed on the frame, and platform-supporting levers fulcrumed on the beam and the scale-frame, said scale-frame being movably and removably mounted in the truck-frame on the cams, and adapted to be raised and lowered by the cams, a truck-platform normally supported on the truck-frame, and adapted to be engaged, raised, and supported as a scale-platform on the scale-levers by the scale-frame when raised by the cams, and to be lowered and disengaged from the scale-frame and supported on the truck-frame when the scale-frame is lowered by the cams, and means to rock one shaft, substantially as set forth.

In witness whereof I have hereunto signed my name, in the presence of two subscribing witnesses, this 28th day of March, 1906.

ALFRED C. JOHNSON.

In presence of—
GEORGE P. GREENHALGH,
GRACE COWDRICK.